Jan. 29, 1952

H. NICHOLS 2,583,873

SEALING ELEMENT

Filed April 22, 1946

*INVENTOR.*
HAYDEN NICHOLS
BY
*Martin E. Anderson*
ATTORNEY

Patented Jan. 29, 1952

2,583,873

UNITED STATES PATENT OFFICE 2,583,873

SEALING ELEMENT

Hayden Nichols, Salt Lake City, Utah

Application April 22, 1946, Serial No. 664,121

8 Claims. (Cl. 220—46)

This invention relates to improvements in seals, more particularly seals of the type employed in connection with cans in which food products and other material is dispensed and also in connection with bottle closures.

The use of hermetically sealed cans for dispensing articles of commerce, and more particularly food products, is quite universal and an enormous number of cans are used for this purpose. Cans are also used for other products, such as paints, varnishes, and many others.

The ordinary tin can of commerce, particularly those used for dispensing food products, are hermetically sealed by solder and require a special tool for opening them. Glass containers used for dispensing food products that do not require hermetical seals are sometimes closed by means of a cap separated from the container itself by an endless rubber band or ring, that serves to form an imperfect seal and whose primary function is to hold the cover in place.

It is the object of this invention to produce a simple and inexpensive seal for use in connection with cans, of the type indicated, that can be readily opened without the use of any special tools.

This invention, briefly described, comprises a container formed either entirely of sheet metal or partly of glass with a metal cap, the two parts being separated so as to form a groove. Positioned in this groove is a sealing element of flexible material, such as soft metal, certain kinds of plastics or a rubber compound. This sealing element is introduced under pressure so as to form a hermetic seal.

The sealing element itself, to which this invention more particularly pertains, is formed so as to be longitudinally extensible and transversely contractable to facilitate its removal from a sealing groove. The sealing element may be tubular and have a readily removable core or the material may be transversely folded, with the adjacent surface normally in airtight contact. Such an element, when subjected to a longitudinal tensional force, will unfold and elongate and at the same time will decrease in cross sectional area and can therefore be readily removed from a sealing groove.

Having thus called attention to the objects of the invention and in a general way described the invention itself, the invention will now be described in greater detail and for this purpose reference will be had to the accompanying drawing in which the invention has been illustrated, and in which:

Figure 12 is a fragmentary side elevation showing the joint between overlapping ends of the seal;

Figure 1:
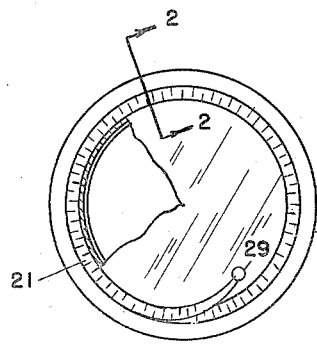
Figure 1 is a top plan view of an ordinary tin can provided with a seal employing the improved sealing element, a portion of the covering being broken away so as to show a part in section looking downwardly along line 1—1, Figure 2.

In the drawing reference numeral 15 designates the can proper, which may be of any size and made from any suitable material.

Figures 2, 3:
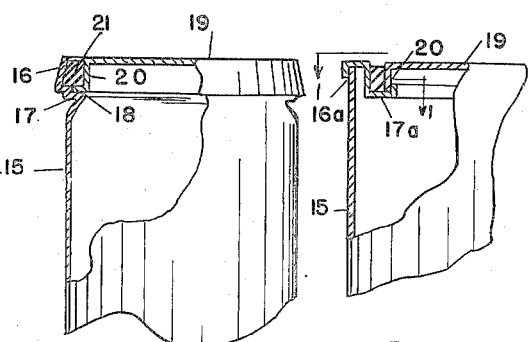
Figure 2 is a fragmentary side elevation of a tin can constructed in the manner shown in Figure 1, a portion thereof being a section taken on line 2—2, Figure 1.
Figure 3 is a view similar to that shown in Figure 2 and shows a slightly modified form of construction.

In Figure 3 the upper edge of the can has been shown as provided with an inwardly tapering annular portion 16 that terminates at its lower end in an inwardly extending flange 17. The cover has been designated by reference numeral 19 and has a downwardly extending flange 20, whose lower edge is flanged outwardly. After the cover has been put in place, the sealing element, which has been designated by reference numeral 21, is positioned in the groove formed between the cover flange 20 and the inner surface of part 16. The sealing element is inserted by suitable tools, which will not be described herein, and in its insertion sufficient force is employed to form a hermetic seal between the parts.

Figures 5, 6:
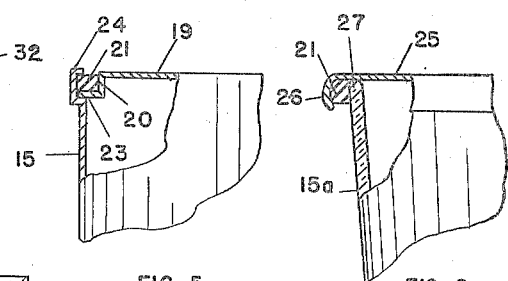
Figures 5 and 6 show two other modifications of the construction.

In the embodiment shown in Figure 2, the construction is very similar to that shown in Figure 3, but instead of forming the wall of the container to obtain the two surfaces 16 and 17, a separate ring is attached to the upper edge of the container and provided with walls 16a and 17a to form a substantially rectangular groove for the reception of a sealing element 21. In Figure 5, a slightly modified form is shown in which the cover has a downwardly extending flange 20 terminating in an outwardly extending flange 23. The top of the container has a portion pressed outwardly with its upper edge 24 forming an inwardly extending flange. Sealing element 21 is positioned in the groove thus formed. In Figure 6 the seal has been shown as positioned on the outside of a can or glass container 15a. The cover 25, in this case, has a downwardly extending flange 26 that is transversely concave on its inner surface and the top of the can, or container, is outwardly flaring at 27. Sealing element 21 is positioned between the adjacent surfaces and applied in position under sufficient pressure to make it conform to the shape of the groove and the outer surface of the glass.

In the above parts of the specification, several modifications have been described to illustrate some of the many different seals for which this sealing element is adapted. Obviously, many other modifications of the container and cap can be designed within the scope of the present invention.

Figure 9:
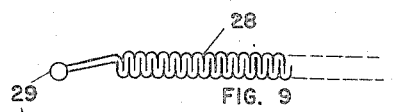
Figure 9 is a side elevation of the sealing element shown in Figures 10 and 12 and shows the folds to a somewhat enlarged scale.
Figure 10:
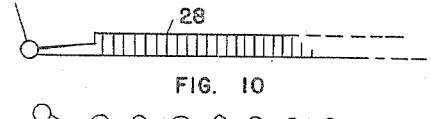
Figure 10 is an edge view of the sealing element shown in Figure 9, before the same has been extended.
Figure 11:
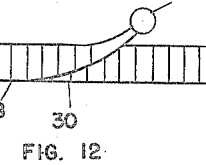
Figure 11 is a view of the sealing element showing its appearance after it has been subjected to a longitudinal force of sufficient value to extend the same.

In Figures 9, 10 and 11 the sealing element has been shown as formed from a narrow strip of material which may be of a yieldable nonresilient metal, like lead, or rubber, or any suitable synthetic. The strip has been shown as folded accordion-like, transversely, and in the actual construction the strip is compressed longitudinally so as to force the adjacent surfaces of the folds into sealing engagement.

Figure 13:
Figure 13 is a side elevation of a sealing element that has been formed into the form of a spiral.
Figure 14:
Figure 14 is an end view of the sealing element in Figure 13.

Instead of using a narrow strip of material folded zigzag in the manner shown, a rectangular or round strip may be employed and subjected to the action of knives or chisels which make inwardly extending cuts 28 that alternate and which are inclined at any desired angle to the longitudinal axis, one series of cuts being on the opposite side from the other. When the material is cut in that manner, it forms an element that is substantially the same as it would be if made from a flat strip folded zigzag or accordion pleated. One end of the sealing strip is made accessible and provided with a finger grip portion 29 that is accessible after the seal has been formed and after it has been put in place. When the container is closed, the sealing element is forced into the groove and the adjacent ends are tapered along line 30, as shown in Figure 12. Any other suitable joint may be employed. The pressure exerted during the sealing, forces the material of the sealing element into closed contact with the sides of the groove forming a hermetic seal. In the embodiment shown in Figures 3, 5 and 6, the groove is narrower at its mouth than farther down with the result that the sealing element must be decreased in its transverse dimension to remove it from the groove. When a sealing element that has been folded transversely as shown in Figures 9 to 12, inclusive, or folded in the form of a spiral as shown in Figures 13 and 14, is subjected to a longitudinal acting tensional force, the different plies separate into a shape somewhat like that shown in Figure 11. As the plies are unfolded the cross sectional areas of the sealing element decreases and it can therefore be removed through an opening that is smaller than the normal dimension of the strip. When a pull is exerted on the part 29, it causes the sealing strip to unfold progressively until it is completely removed from the groove in which it is positioned. When a can or other container is closed by a seal employing a sealing element like the one above described, it can be readily opened without the use of any special tools, as it merely requires a moderate pull on member 29 to start the unfolding of the sealing element and its gradual removal from the groove.

In some instances, it is desirable to employ for the sealing element a metal such as lead that can be readily bent and deformed under pressure. In other places the sealing element may be made from a rubber composition either of natural rubber or one of the so-called synthetics which are both elastic and resilient. In other instances again, it may be desirable to employ some of the many plastics now in use.

Figure 4:
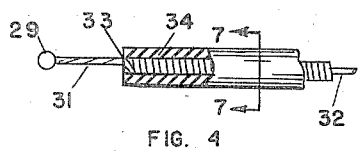
Figure 4 is a side elevation of a sealing element with parts thereof broken away and shown in section.
Figure 7:
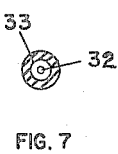
Figure 7 is a section taken on line 7—7, Figure 4.
Figure 8:
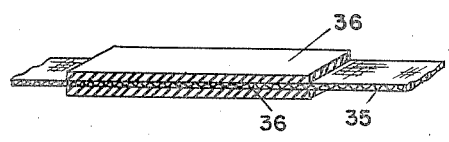
Figure 8 is a perspective view partly in section to a much enlarged scale, showing the strip employed in constructing the sealing element shown in Figure 15.
Figure 15:
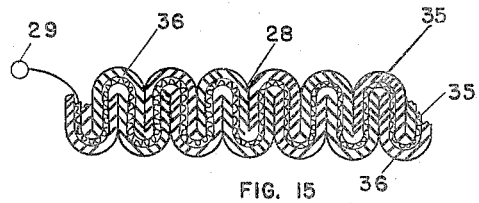
Figure 15 is a side view, to an enlarged scale, showing the appearance of a seal after it has been formed by folding the strip shown in Figure 8, but before it has received its final shape.

In Figures 9 to 14, inclusive, two forms of the sealing strip have been illustrated and in Figures 4 and 7, another modification has been shown and a still further modification has been illustrated in Figures 8 and 15.

Referring now to Figure 4, reference numeral 31 designates a cord which may be a thin hard twisted cotton cord of any suitable size or a wire or a strip of synthetic material of any suitable kind. The cord is first wrapped about a wire core 32 so as to form a closely wound spiral, the spiral while still on the wire, is dipped into liquid latex or any other suitable agglutinant so as to give to the outer surface of the spiral a skim coat that holds it from unravelling. This skim coat has been designated by reference numeral 33 in Figures 4 and 16. The cord core with its rubber coating is now again dipped or in any other manner covered with a layer 34 of rubber and the whole assembly is then cured to whatever extent and consistency deemed necessary. The result of this is a sealing element which, in the drawing, has been shown as of circular cross section, but which may be of any suitable cross section. The core formed by the helical cord or wire can be readily removed by applying tension to the part 29. As the core is removed there remains a tubular member which has a flexible wall and is therefore readily collapsible. When such a strip is positioned in a groove like that shown in Figures 2 to 6 and the core is removed by a pull thereon, the sealing strip will decrease in cross sectional areas or be readily deformed to such an extent that it can be easily removed and will be removed by the action of the cord up to the point where the spiral begins to unfold. Such a sealing strip can be easily manufactured and has no cuts or folds through which air or gas may accidentally escape.

Figure 16:
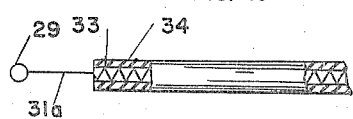
Figure 16 is a view, similar to that in Figure 4 and shows a slightly modified construction.

In Figure 16 a similar construction has been shown, but in this figure the strip 31a is a band or ribbon that is folded zigzag after which it is compressed and covered with a skim coat 33 of rubber. After this is in place, the outer layer 34 can then be applied, the same as in the embodiment shown in Figures 4 and 7.

In Figures 8 and 15 a slightly modified form of the construction has been shown. This construction is intended more primarily for places where a larger sealing strip is required, although it may be formed of any size. The strip shown in Figure 15 is somewhat analogous to the one shown in Figure 9, but differs from it in this, that it has a fabric like that indicated at 35. The strip is cut from a large sheet of fabric that has been covered on both sides with rubber layers 36. The strips are then folded zigzag and shown in Figure 15 and are longitudinally compressed in a mold and then given a heat treatment that puts them in a condition to retain their shape.

In Figure 15, the top and bottom have been shown as curved; however, after the strip has been compressed in a mold, it will be flat on all four sides. The fabric strip 35 terminates in a member 29 that can be grasped for the purpose of unfolding the strip in order to remove it from the groove. In the construction shown in Figure 15, the outer surfaces must be covered by soapstone or some other material that prevents the rubber from adhering where it comes into contact, as for example, along the folds designated by reference numeral 28.

It will be noted that the characteristic feature of all of the sealing strip constructions shown and described is that when it is subjected to a longitudinal tension it will contract transversely or decrease in cross sectional area so that it may be readily removed from the groove in which it is positioned. This is effected either by unfolding the zigzag strip shown in Figures 9 to 12 or unfolding the cores in Figures 4 and 16. The construction shown in Figure 15 is analogous to that shown in Figure 9. It is, of course, essential that when the construction shown in Figures 9 to 12 and in Figure 15 is employed, care must be taken to see that the parts do not weld along lines 28. When the construction illustrated in Figures 4 and 16 is used, the core, which is either spirally wound or folded, is merely dipped in a rubber latex or some other suitable agglutinant which does not penetrate the core itself, but merely forms a coating about the outer surface thereof. The core material is therefore readily separated from the coating when sufficient tension is exerted in the cord 31.

Although the sealing strip has been illustrated in connection with cans and containers of the type in which food is sold, it is, of course, evident that it may be used in many other places where a readily openable seal is desired.

From the above description it will be apparent that the sealing element comprises a member of yielding material such as a soft metal or a yielding plastic or a rubber-like material that is folded transversely, either into accordion pleats like that shown in Figures 9 and 11, inclusive, or spiralled as shown in Figures 4, 13 and 14.

The essential characteristic of the strip is that by subjecting it or some parts thereof to a tensional strain its cross sectional area will decrease so that the strip may be readily removed from a groove.

Since the sealing member must decrease in cross sectional area when subjected to tension, the adjacent surfaces of the transverse folds or coils must be free to separate in response to a tensional force. The adjacent surfaces of the folds or coils may be attached to each other by a weak adhesive or they may be held in assembled relation by an outer covering only.

The outer surface of the sealing element may be covered by a substance such as wax that will adhere strongly to the metal surfaces and which will break or tear when the sealing member is reduced in cross section due to tension.

Attention is called to the fact that the convoluted member which is either folded zigzag or coiled as a helix may be round like a cord or flat like a ribbon and applicant's terms "cord" and "ribbon" are therefore to be considered a mechanical equivalent. In the same manner the term "convoluted" is intended to cover zigzag folds and helical folds.

Having described the invention what is claimed as new is:

1. In a container of the type having a closure and a seal groove between the closure and container, the improvement which comprises, a longitudinally extensible and transversely contractible sealing element disposed in the groove and having transverse folds with adjacent surfaces in sealing contact, the folded surfaces being separable in response to a force acting longitudinally of the member when it is pulled to remove it from the groove.

2. In a container of the type having a closure and a seal groove between the closure and container, the improvement which comprises, a substantially flat sealing strip disposed in the groove having transverse folds, the adjacent surfaces of which are in sealing contact, but separable when the strip is subjected to a force acting longitudinally thereof.

3. In a container of the type having a closure and a groove between the closure and container, the improvement which comprises, an elongated extensible sealing member within said groove formed from a strip of flexible material, of ribbon shape, folded transversely and compressed longitudinally to bring adjacent surfaces into close contact, one end of the strip being accessible and to which a tensional force may be applied to effect unfolding and removal of the strip from the groove.

4. In a container of the type having a closure and a seal groove between the closure and container, the improvement which comprises, a substantially flat strip member of readily compressible material disposed in the groove, said material being folded transversely and being covered with yieldable resilient material, said member, when subjected to a longitudinally acting tensional force, being adapted to unfold and decrease in cross section, whereby it may be removed from the groove.

5. In a container of the type having a closure and a seal groove between the closure and container, the improvement which comprises, a sealing member in the groove formed from a transversely folded strip of non-metallic material the adjacent surfaces of which are adapted to unfold and separate in response to a longitudinally acting tensional force to decrease the cross sectional area of the member, whereby it may be removed from the groove.

6. In a container of the type having a closure and a seal groove between the closure and container, the improvement which comprises, a sealing member in the groove having a core formed as a ribbon-like element folded transversely, and an enclosing covering of readily deformable resilient material, the several folds being retained in assembled relation by the outer covering and separable in response to a longitudinal force, whereby the cross sectional area of the member will decrease as the core is unfolded.

7. In a container of the type having a closure and a seal groove between the closure and container, the improvement which comprises, a sealing member in the groove having transversely zigzag form in which adjacent surfaces are in close contact but separable in response to tensional forces, whereby the member may be readily removed from the groove by applying tension thereto.

8. In a container of the type having a closure and a seal groove between the closure and container, the improvement which comprises, a sealing member in the groove formed from a strip of flexible material folded transversely to bring adjacent surfaces into close contact, one end of the strip being accessible, whereby when a tensional force is applied to the accessible end the strip will narrow transversely and may be removed from the groove.

HAYDEN NICHOLS.

REFERENCES CITED

The following references are of record in the file of this patent:

UNITED STATES PATENTS

| Number | Name | Date |
|---|---|---|
| 249,560 | Wagenen | Nov. 15, 1881 |
| 414,882 | Guibal | Nov. 12, 1889 |
| 579,643 | Gleason | Mar. 30, 1897 |
| 1,214,147 | Fisher | Jan. 30, 1917 |
| 1,451,225 | Krause | Apr. 10, 1923 |
| 1,476,213 | O'Brien | Dec. 4, 1923 |
| 1,800,791 | Gunter | Apr. 14, 1931 |
| 1,878,677 | Curtis | Sept. 20, 1932 |
| 2,299,598 | Schlegel | Oct. 20, 1942 |
| 2,372,885 | Derby | Apr. 3, 1945 |

FOREIGN PATENTS

| Number | Country | Date |
|---|---|---|
| 10,537 | Great Britain | 1898 |